(12) United States Patent
Van Heugten et al.

(10) Patent No.: US 10,838,237 B2
(45) Date of Patent: Nov. 17, 2020

(54) PRISM-ENHANCED LENSES AND METHODS OF USING PRISM-ENHANCED LENSES

(71) Applicant: e-Vision Smart Optics, Inc., Sarasota, FL (US)

(72) Inventors: Anthony Van Heugten, Sarasota, FL (US); Harry Milton, Sarasota, FL (US)

(73) Assignee: e-Vision Smart Optics, Inc., Sarasota, FL (US)

(*) Notice: Subject to any disclaimer, the term of this patent is extended or adjusted under 35 U.S.C. 154(b) by 0 days.

(21) Appl. No.: 16/037,710

(22) Filed: Jul. 17, 2018

(65) Prior Publication Data
US 2019/0049752 A1 Feb. 14, 2019

Related U.S. Application Data

(63) Continuation of application No. PCT/US2017/015750, filed on Jan. 31, 2017.
(Continued)

(51) Int. Cl.
*G02C 7/08* (2006.01)
*G02F 1/29* (2006.01)
(Continued)

(52) U.S. Cl.
CPC .............. *G02C 7/083* (2013.01); *G02B 3/08* (2013.01); *G02C 7/04* (2013.01); *G02F 1/29* (2013.01);
(Continued)

(58) Field of Classification Search
CPC . G02B 3/08; G02C 7/00; G02C 7/083; G02C 7/04; G02C 2202/20; G02F 1/29; G02F 2001/294
See application file for complete search history.

(56) References Cited

U.S. PATENT DOCUMENTS 4,385,805 A * 5/1983 Channin ............ G01R 13/403
349/141
4,904,063 A * 2/1990 Okada ............ G02F 1/133371
349/200
(Continued)

FOREIGN PATENT DOCUMENTS

CN 101280905 A 10/2008
JP 2009098644 A * 5/2009

OTHER PUBLICATIONS

Aiko K. Ruprecht, Christof Pruss, Hans J. Tiziani, Wolfgang Osten, Peter Lucke, Arndt Last, Jurgen Mohr, Peter Lehmann, "Confocal micro-optical distance sensor: principle and design," Proc. SPIE 5856, Optical Measurement Systems for Industrial Inspection IV, (Jun. 13, 2005).*
(Continued)

*Primary Examiner* — Hoan C Nguyen
(74) *Attorney, Agent, or Firm* — Smith Baluch LLP

(57) ABSTRACT

An electro-active lens is presented which utilizes a surface relief structures and an electro-active material, with a change in refractive index facilitating the change in optical properties. A molded structure and a liquid crystal are used to form a diffractive lens. In addition to the classical approach of utilizing diffractive optics and multiple Fresnel zones to form a lens, an additional structure is placed between Fresnel zones in order to improve the diffraction efficiency across the visible spectrum, and reduce chromatic aberration.

21 Claims, 11 Drawing Sheets

Related U.S. Application Data

(60) Provisional application No. 62/321,893, filed on Apr. 13, 2016, provisional application No. 62/289,512, filed on Feb. 1, 2016.

(51) Int. Cl.
  *G02B 3/08* (2006.01)
  *G02C 7/04* (2006.01)

(52) U.S. Cl.
  CPC .... *G02C 2202/20* (2013.01); *G02F 2001/294* (2013.01)

(56) References Cited

U.S. PATENT DOCUMENTS

| | | | |
|---|---|---|---|
| 5,940,152 A | 8/1999 | Wilson et al. | |
| 7,327,434 B1 | 2/2008 | Ren et al. | |
| 9,541,772 B2* | 1/2017 | De Sio | G02C 7/04 |
| 2005/0231677 A1* | 10/2005 | Meredith | G02B 3/14 |
| | | | 349/143 |
| 2006/0109874 A1 | 5/2006 | Shiozaki et al. | |
| 2006/0164593 A1* | 7/2006 | Peyghambarian | G02F 1/29 |
| | | | 349/200 |
| 2007/0198083 A1 | 8/2007 | Sel et al. | |
| 2007/0206181 A1 | 9/2007 | Arenberg et al. | |
| 2008/0094694 A1 | 4/2008 | Yun et al. | |
| 2008/0309545 A1 | 12/2008 | Sabet et al. | |
| 2010/0225834 A1* | 9/2010 | Li | G02C 7/08 |
| | | | 349/13 |
| 2011/0267570 A1* | 11/2011 | Saito | G02B 3/08 |
| | | | 349/139 |
| 2011/0267693 A1 | 11/2011 | Kobayashi et al. | |
| 2011/0292335 A1 | 12/2011 | Schwiegerling | |
| 2012/0075870 A1 | 3/2012 | Kayanuma et al. | |
| 2012/0140166 A1 | 6/2012 | Zhao | |
| 2012/0268816 A1* | 10/2012 | Bae | G02B 3/08 |
| | | | 359/463 |
| 2013/0222756 A1 | 8/2013 | Heugten | |
| 2013/0286309 A1* | 10/2013 | Valley | G02B 5/1876 |
| | | | 349/35 |
| 2014/0327875 A1 | 11/2014 | Blum et al. | |
| 2015/0316820 A1* | 11/2015 | Duston | G02F 1/29 |
| | | | 349/138 |
| 2015/0378177 A1 | 12/2015 | Blum et al. | |
| 2018/0231801 A1* | 8/2018 | Gutierrez | G02C 11/10 |

OTHER PUBLICATIONS

Holmes et al., "Strehl's ratio for a two-wavelength continuously deformable optical adaptive transmitter", J. Opt. Soc. Am./vol. 73, No. 9/Sep. 1983.*

Guoqiang Li et al., "High-efficiency switchable diffractive lens"; Proc. SPIE 6310, Photonic Devices and Algorithms for Computing VIII, 63100H (Sep. 8, 2006).*

International Search Report and Written Opinion in PCT/US2017/015750 dated Apr. 10, 2017, 15 pages.

Lou et al., Design and fabrication of tunable liquid crystal diffractive lens. Optical Engineering 52(9), Sep. 2013, 6 pages.

Li et al., "Near-diffraction-limited tunable liquid crystal lens with simplified design." Optical Engineering 52.3 (2013): 035007. 8 pages.

* cited by examiner

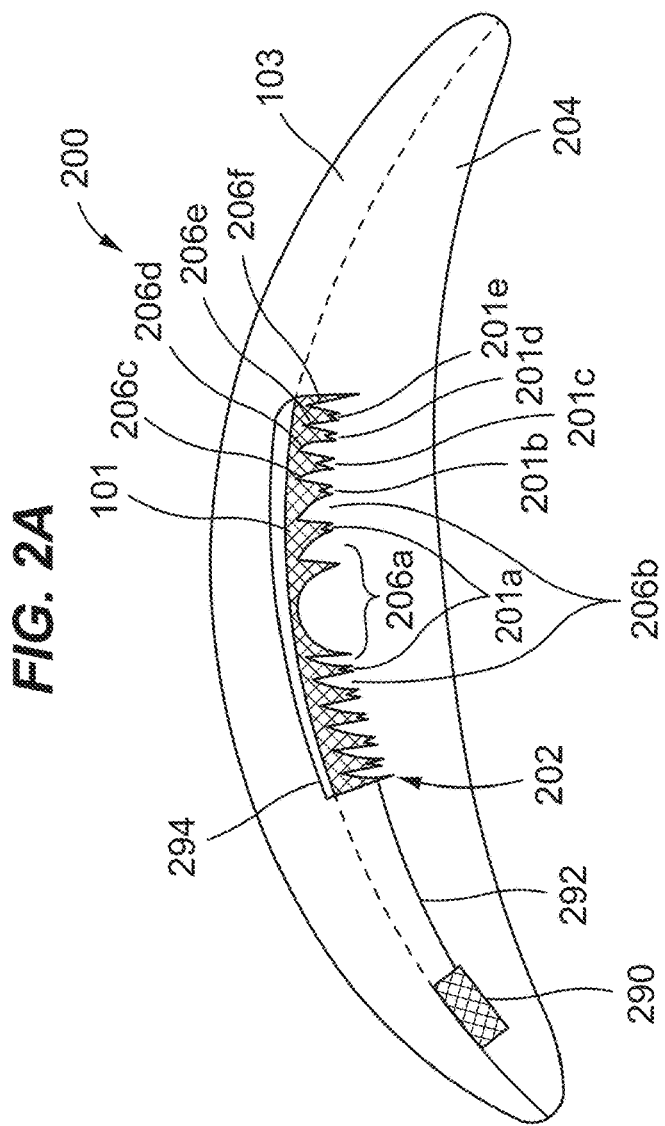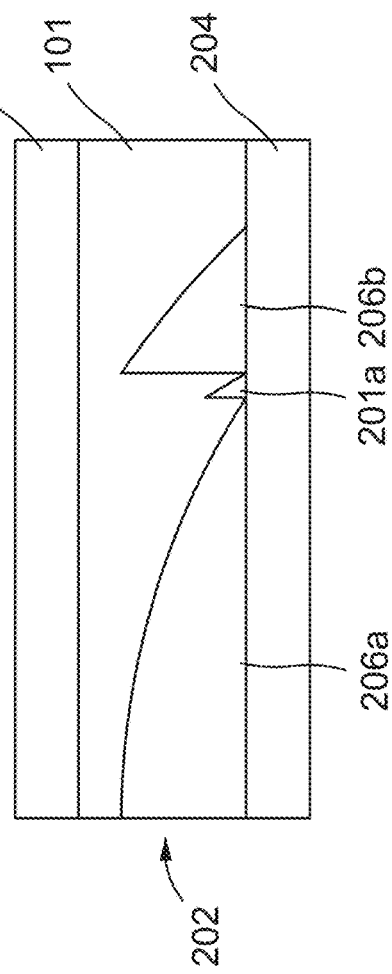
*FIG. 2A*
*FIG. 2B*

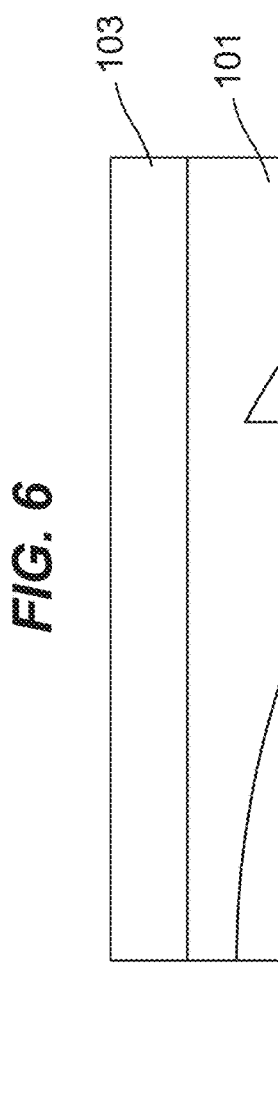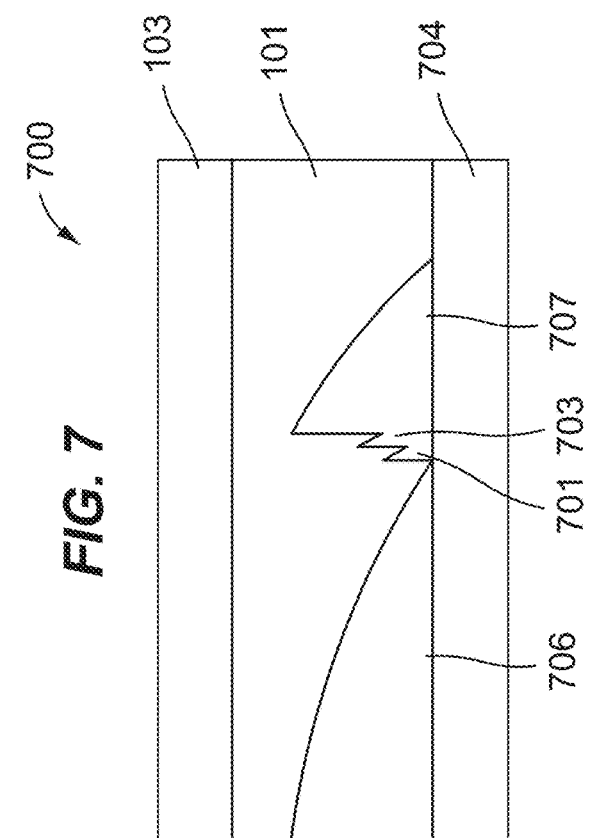

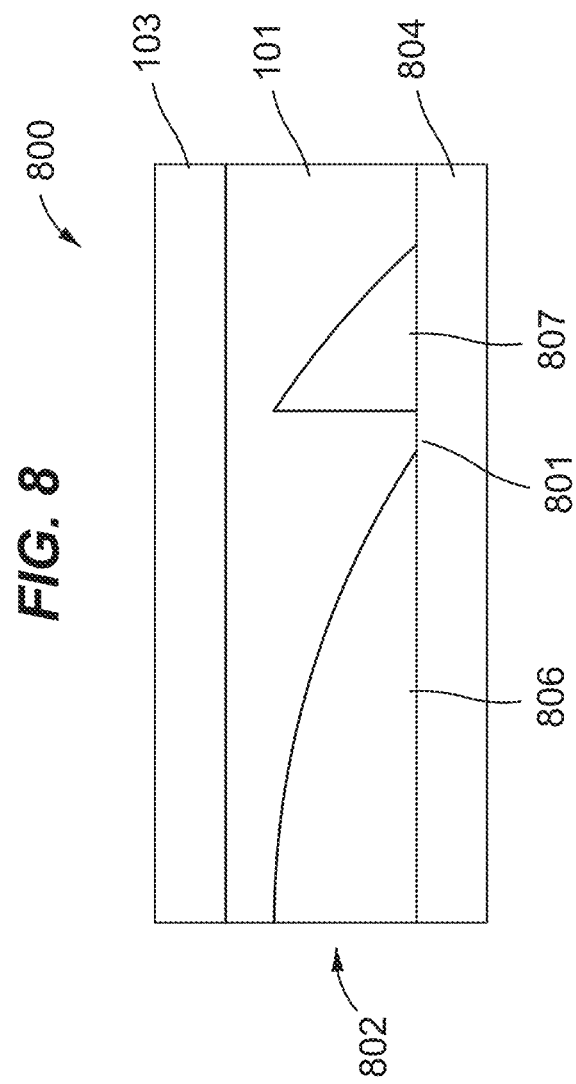

650 nm at 0.902 m 550 nm at 1.064 m

PRISM-ENHANCED LENSES AND METHODS OF USING PRISM-ENHANCED LENSES

CROSS-REFERENCE TO RELATED APPLICATIONS

This application is a bypass continuation application of International Application No. PCT/US2017/015750, filed Jan. 31, 2017, entitled "Prism-Enhanced Lenses and Methods of Using Prism-Enhanced Lenses," which claims the priority benefit, under 35 U.S.C. 119, of U.S. Application No. 62/321,893, filed Apr. 13, 2016, and entitled "Prism-Enhanced Lenses," and of U.S. Application No. 62/289,512, filed Feb. 1, 2016, and entitled "Enhanced Surface Relief Lenses." Each of these applications is incorporated herein by reference in its entirety.

BACKGROUND

A fundamental limitation of a diffraction-based lens is its intrinsic wavelength dependence, which results in reduced diffraction efficiency outside of the lens's specified design wavelength. This arises from the requirement of constructive interference at the focal point of the lens, which can generally only be optimized for a single wavelength of light in the visible region.

As understood by those of skill in the art, a conventional diffractive lens includes one or more phase wraps, or phase resets. A phase wrap (phase reset) is a sawtooth-like modulation of the lens's phase retardation profile, with each tooth or "wrap" having an optical path length approximately equal to an integer number of wavelengths. This allows the device to be thinner, with the optical power induced via constructive interference at the focal point via diffraction rather than refraction across the whole lens.

A phase reset corresponding to an integer number of wavelengths produces perfect constructive interference and is considered to have a diffraction efficiency of 100%. However, when the phase reset is not an integer number of wavelengths, the performance of the lens is reduced due to the lack of perfect constructive interference at the focal point, which results in a reduction of diffraction efficiency. The diffraction efficiency decreases as the optical path difference associated with a phase reset diverges from an integer number of wavelengths. The minimum diffraction efficiency occurs when the phase reset corresponds to a half number of wavelengths, where the phase reset corresponds to destructive interference.

Due to the variation in wavelength across the visible spectrum, the phase reset in a conventional diffractive lens only corresponds to a phase retardation of an integer number n of wavelengths for a single wavelength, defined as the design wavelength, Ao. For other wavelengths of light, the phase reset may correspond to a non-integer number of wavelengths; as the wavelength gets larger or smaller than the design wavelength, the phase difference at the phase reset diverges from the integer number of wavelengths. This degrades the lens's performance away from the design wavelength.

The diffraction efficiency of a phase based diffractive lens (η) can be described quantitatively using the equation:

$$\eta(\lambda) = sinc^2\left(\pi\left(\frac{\lambda_0}{\lambda} - k\right)\right)$$

where $\lambda$ is the wavelength of light, $\lambda_0$ is the design wavelength of the lens, and k is the diffractive order. (In the case of a diffractive lens, the diffractive order is the first order, k=1, for correct operation.) This function does not include the impact of optical dispersion associated with the material used to make the lens. Material dispersion may further reduce the diffraction efficiency further at wavelengths away from the design wavelength.

Some example calculations are shown below for a diffractive lens with a design wavelength ($\lambda_0$) of 550 nm:

TABLE 1

| Wavelength ($\lambda$) | Diffraction Efficiency ($\eta$) |
|---|---|
| 450 nm | 0.848 |
| 500 nm | 0.968 |
| 550 nm | 1 |
| 600 nm | 0.978 |
| 650 nm | 0.925 |

For this lens, the diffraction efficiency varies by over 15% over the visible spectrum. This reduction in diffraction efficiency can be of greater importance when working with multi-order diffractive lenses, whereby the phase reset occurs at an integer number of wavelengths more than one.

SUMMARY

The inventors have recognized the chromatic dependence of diffractive lenses is a major disadvantage when compared to refractive optics. The present technology addresses this disadvantage by providing a diffractive lens with additional prismatic structures at the phase wrap regions to mitigate unwanted destructive interference. The additional prismatic structures provide a compromise between diffractive efficiency at the design wavelength and at other wavelengths. This is particularly beneficial for ophthalmic lenses, including spectacle, contact, and intraocular lenses.

The present technology can be implemented as an electro-active lens with an electro-active material, such as liquid crystal material, in optical communication with a surface relief structure that includes additional prismatic structures. The surface relief structure may be molded, then bonded to another substrate to form a cavity that holds the liquid crystal material.

Embodiments of the present invention include an electro-active lens comprising a first substrate, a second substrate, a liquid crystal material disposed between the first substrate and the second substrate, and a surface relief structure formed in the first substrate opposite the second substrate. The surface relief structure defines a Fresnel lens with a plurality of concentric rings and at least one prism structure disposed between a pair of concentric rings in the plurality of concentric rings.

In some cases, the mth ring in the plurality of concentric rings has an inner radius greater than:

$$r_m = \sqrt{2mf\lambda_0},$$

where m is an integer greater than 1, f is the focal length of the Fresnel lens, and Ao is a design wavelength of the electro-active lens. If there are m−1 prism structures having an aggregate width w, for example, the inner radius of the mth ring in the plurality of concentric rings is equal to a sum of $r_m$ and w.

The prism structure may comprise an annular prism structure that is concentric with the pair of concentric rings. In some examples, there may be an annular prism structure between and concentric with each pair of concentric rings in the plurality of concentric rings. And in some cases, one or more of the prism structures may partially overlaps with an adjacent concentric ring. One or more of the prism structures may define a plurality of peaks, a curved surface, or both. The prism structure(s) may have a height of about 0.1 microns to about 50 microns and a width of about 5 microns to about 200 microns.

A multi-order prism-enhanced lens (i.e., one with concentric rings whose heights are equal to mλ, where m is an integer greater than one and λ is the design wavelength) may have a Strehl ratio of greater than about 0.85 at a wavelength of about 550 nm, a Strehl ratio of greater than about 0.70 at a wavelength of about 450 nm, and a Strehl ratio of greater than about 0.60 at a wavelength of about 450 nm. For instance, the electro-active lens's Strehl ratio may be greater than about 0.65 or even 0.80 over a wavelength range of about 450 nm to about 650 nm.

Another example electro-active lens comprises a first substrate, a second substrate, a liquid crystal material disposed between the first substrate and the second substrate, and a surface relief structure formed in the first substrate opposite the second substrate. This surface relief structure defines a superposition of concentric Fresnel lenses. The superposition of concentric Fresnel lenses may include a first Fresnel lens having a first height and a second Fresnel lens having a second height smaller than the first height.

Other embodiments include a method of focusing light. This method includes focusing light with an electro-active lens comprising a first substrate, a second substrate, a liquid crystal material disposed between the first substrate and the second substrate, and a surface relief structure formed in the first substrate opposite the second substrate. The surface relief structure defines a Fresnel lens having a plurality of concentric rings and at least one prism structure disposed between a pair of concentric rings in the plurality of concentric rings. Applying a voltage to the liquid crystal material changes a focal length of the electro-active lens.

Another example electro-active lens includes a first substrate, a second substrate, a liquid crystal material disposed between the first substrate and the second substrate, and a surface relief structure formed in the first substrate opposite the second substrate. This surface relief structure defines a Fresnel lens with a plurality of concentric rings and at least one gap element disposed between a pair of concentric rings in the plurality of concentric rings. This gap element may have a width of about 25 microns.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 2A shows a cross section of an electro-active, prism-enhanced ophthalmic lens that includes a liquid crystal layer disposed between a flat substrate and a substrate defining a Fresnel lens and a prismatic structure disposed between two rings of the Fresnel lens.

FIG. 2B shows a close up of the cross section shown in FIG. 2A.

FIG. 6 shows a cross section of a prism-enhanced lens with a rounded prism structure between a pair of concentric rings of the Fresnel lens.

FIG. 7 shows a cross section of a prism-enhanced lens with a jagged prism structure between a pair of concentric rings of the Fresnel lens.

FIG. 8 shows a cross section of a Fresnel lens with a gap between a pair of concentric rings of the Fresnel lens.

DETAILED DESCRIPTION

An electro-active, prism-enhanced lens can be characterized as having a surface relief structure formed by combining, or superposing, two or more Fresnel lenses. These Fresnel lenses may be spherical Fresnel lenses with different design wavelengths or focal lengths; cylindrical Fresnel lenses with different orientations, design wavelengths, or focal lengths; or combinations of spherical and cylindrical Fresnel lenses. They may be scaled and/or offset from each other along the prism-enhanced lens's optic axis before being superposed. The exact scaling, shifting, and shape may depend in part on the dispersion of the lens material, the dispersion of the liquid crystal in the state of lensing operation (e.g., extraordinary refractive index in a vertically aligned system, ordinary refractive index in a planar aligned system, or an intermediate state), or both. The resulting superposed structure may be circularly symmetric or asymmetric (e.g., for correcting astigmatism) and can be used to define a mold that is used to form the lens substrates.

Compared to a conventional Fresnel lens, a prism-enhanced lens may have better (average) optical performance over a broader range of wavelengths, e.g., over the visible spectrum (about 450-650 nm). For example, a prism-enhanced lens may have a higher average diffraction efficiency over the visible spectrum than a conventional Fresnel lens. Alternatively or additionally, the Strehl ratio (explained below) of a prism-enhanced lens may vary by about 0.25 or less (e.g., from 0.6 to 0.85, or by about 0.20, 0.15, 0.10, or 0.05) over a wavelength range of 450-650 nm, whereas the Strehl ratio for a comparable conventional Fresnel lens may vary by more than 0.25 (e.g., by about 0.50) over the same wavelength range.

Nevertheless, a prism-enhanced lens may suffer drawbacks compared to some conventional Fresnel lenses, including a larger smallest resolvable spot size at the center design wavelength. In other words, a prism-enhanced lens may have a smaller modulation transfer function (MTF) at the center design wavelength than a comparable conventional Fresnel lens. But it should have a larger MTF at other wavelengths than such a comparable conventional Fresnel lens.

A prism-enhanced lens can be used for many different types of applications. They are particularly well suited to vision correction, which does not need the diffraction-limited optical performance often required by camera lenses and other optical applications. For instance, an electro-active, prism-enhanced lens can be used to form all or part of a spectacle lens, contact lens, intraocular lens, or any other lens for ophthalmic use.

An Electro-Active Fresnel Lens

Figure 1:
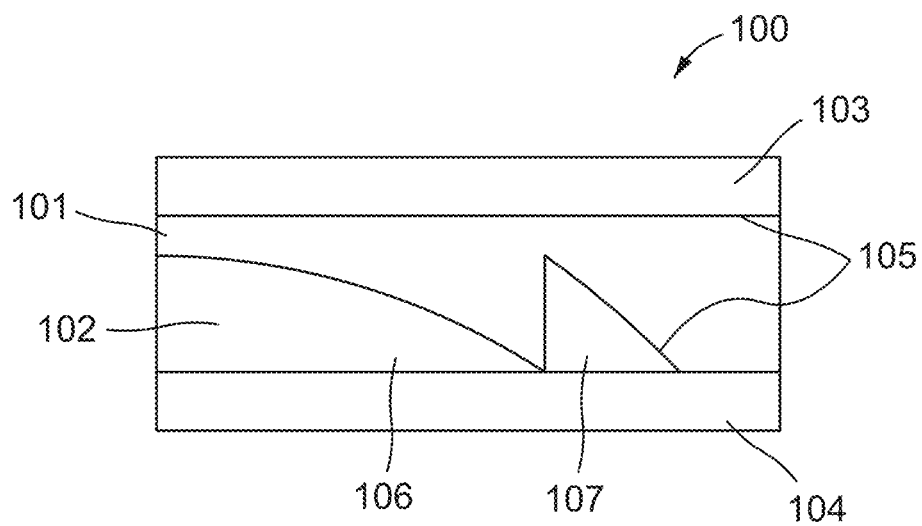
FIG. 1 shows a cross section of an electro-active lens that includes a liquid crystal layer disposed between a flat substrate and a substrate defining a Fresnel lens.

FIG. 1 illustrates a cross section of two Fresnel zones 106 and 107 in a surface relief liquid crystal electro-active lens 100. The lens 100 includes a vertically aligned liquid crystal layer 101 disposed between two substrates 103 and 104, with an alignment layer and transparent conductive layer applied to the substrate surfaces 105 in contact with the liquid crystal layer as readily understood in the art. Substrate 104 defines a surface relief structure 102—here, a Fresnel lens—with diffractive structures (concentric rings) 106 and 107. The diffractive structures 106 and 107 can be between 0.5-50 microns in height depending upon the number of wavelengths per phase reset, the birefringence of the liquid crystal, the focal power of the lens and the design wavelength of the incident light. For a standard one wavelength per phase reset lens, the diffractive structures are typically 2-5 microns high. For a +1.00 D lens designed for 450 nm light, the radii of the diffractive structures 106 and 107 are 950 microns and 390 microns, respectively, when considering the first two Fresnel zones.

The refractive index of the substrate 104 may be matched to the refractive index of the liquid crystal 101 so that the surface relief structure 102 is not noticeable when the liquid crystal 101 is in an "off" or unmodulated state. Applying a voltage to the liquid crystal 101 causes the liquid crystal 101 to re-orient, thereby changing the liquid crystal's refractive index as understood in the art. This change in the liquid crystal's refractive index makes the surface relief structure 102 apparent, thereby changing the optical power of the lens 100.

Prism-Enhanced Ophthalmic Lenses

FIGS. 2A-2D show different views of an electro-active, prism-enhanced ophthalmic lens 200. Like the lens 100 shown in FIG. 1, the prism-enhanced ophthalmic lens 200 includes liquid crystal material 101 disposed in a cavity formed between substrates 103 and 204, with a surface relief structure 202 formed in substrate 204. Together, the substrates 103 and 204 form a base or static concave-convex lens that provides a fixed optical power depending on the substrates' curvatures and indices of refraction. (In other cases, the substrates may be flat with uniform indices of refraction to provide little to no fixed optical power. Or they may be shaped to form a biconvex, biconcave, plano-concave, or plano-convex lens.) The substrates' sizes, shapes, and materials may be chosen such that the lens 200 is a contact lens, intraocular lens, or spectacle lens.

Figure 2C:
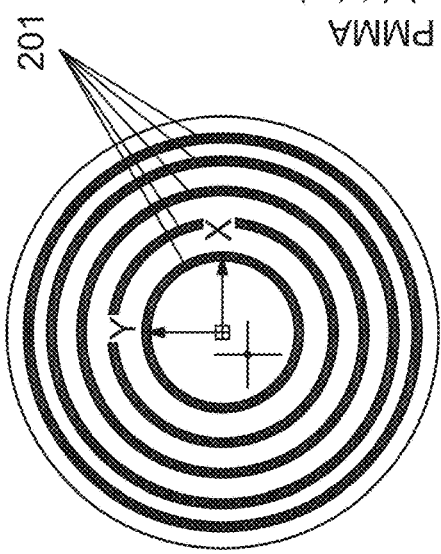
FIG. 2C shows a plan view of the surface relief structure of the prism-enhanced lens shown in FIGS. 2A and 2B.
Figure 2D:
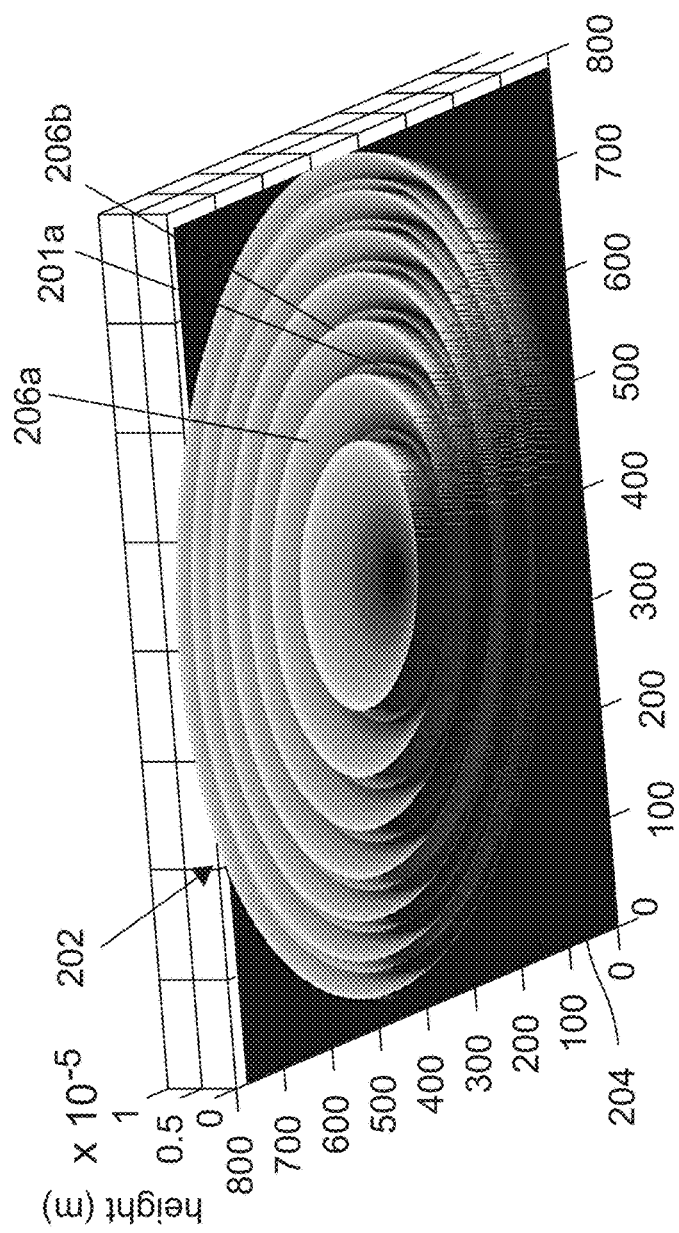
FIG. 2D shows a perspective view of the surface relief structure of the prism-enhanced lens shown in FIGS. 2A-2C.

The surface relief structure 202, shown in greater detail in FIGS. 2B-2D, defines a Fresnel lens that includes concentric Fresnel rings 206a-206f (collectively, concentric rings 206). Unlike in a conventional Fresnel lens, however, the surface relief structure 202 includes extra prism structures 201a-201e (collectively, prism structures 201), each of which is disposed in between a pair of concentric rings 206. In operation, the prism structures 201 redirect light into the focal point of the diffractive lens 200. Other example lenses may have fewer prism structures, e.g., prism structures between only the inner or outer few concentric rings, one prism structure between every second or third pair of concentric rings, etc. There may also be a blending region near the outer perimeter of the Fresnel lens, e.g., to provide a progressive change in optical power.

In this example, each prism structure 201 is ring-shaped and concentric with the concentric rings 206 of the Fresnel lens. For instance, prism structure 201a is disposed between and concentric with concentric rings 206a and 206b. Other example lenses may have prism structures with other shapes when viewed along the lens's optic axis, including C-shaped prism structures, periodically segmented annular prism structures, and aperiodically segmented annular prism structures. For instance, the additional prism structures may be shaped to provide cylindrical power along one or more axes orthogonal to the lens's optical axis.

Depending on their sizes and shapes, the extra prism structures 201 can be thought of as forming a second Fresnel lens that is concentric with the concentric rings 206 of a first Fresnel lens. The first and second Fresnel lenses may be optimized for operation at different wavelengths. They may have different focal lengths at a given wavelength and may be offset with respect to each other along the optic axis of the ophthalmic lens 200. Put differently, there may be a bias or offset applied to one of the Fresnel lenses (e.g., the first Fresnel lens) before the Fresnel lenses are superposed to form the composite relief structure shown in FIGS. 2C and 2D. The differences between the first and second Fresnel lenses can also be expressed or manifested as different numbers of rings, with these rings having different sizes, shapes, and positions.

The ophthalmic lens 200 also includes various electronic components 290, including but not limited to a processor/drive circuit, power supply, antenna, or photodetector, for actuating the liquid crystal material 101. In this case, the electronic components 290 are sandwiched between the substrates 103 and 204; in other cases, they may be disposed outside the lens 200. These electronic components 290 modulate the ophthalmic lens's focal length by changing the voltage applied to the liquid crystal material 101 via transparent or nearly transparent conductive traces 292 connected to electrodes 294 (only one shown) on either side of the liquid crystal material 101. The electrodes may be formed of a transparent conductive material, such as indium tin oxide (ITO), deposited on the substrate 103 and the surface relief structure 202. These electrodes are not necessarily patterned, but additional conductive material (e.g., the ITO) may be deposited and patterned to form the conductive traces 292 that connect the electrodes to the driving electronics.

At or near a bias voltage of 0 volts, the liquid crystal material's refractive index may substantially match that of the surrounding substrate 204, making the surface relief pattern 202 appear transparent or nearly transparent to the wearer. Applying a voltage to the liquid crystal material 101 changes the liquid crystal material's refractive index, changing the optical power provided by the portion of the lens 200 containing the surface relief structure 202. This change in optical power may be positive or negative depending on the liquid crystal material, applied voltage, surface relief structure, or lens shape.

Typically, each prism structure 201 is shorter and narrower than the adjacent concentric rings 206. In this example, the maximum height of the prism structure 201a is from 0.1 to 50 microns (e.g., 0.25 microns, 0.50 microns, 0.75 microns, 1 micron, 2 microns, 5 microns, 7.5 microns, 10 microns, 15 microns, 25 microns, 30 microns, 35 microns, 40 microns, 45 microns, or any sub-range or value within this range). The width of the prism structures 201a is typically 5 microns to 200 microns (e.g., 7.5 microns, 10 microns, 15 microns, 25 microns, 50 microns, 75 microns, 100 microns, 125 microns, 150 microns, 175 microns, or any sub-range or value within this range). For instance, the prism structures 201 may each be 25 microns wide and may have heights that vary from 0.25 microns to 0.75 microns.

The prism structures 201 may have different heights, different widths, or both. For instance, the inner prism structures 201 may be taller, wider, or both taller and wider than the outer prism structures 201.

The second Fresnel zone 206b is shifted outwards from the center of the lens 200 to make space for the prism structure 201a, which modifies the zone spacing of the Fresnel zones. In a conventional Fresnel lens, the radius of the Fresnel zone spacing is calculated using the equation $r_m = \sqrt{2mf\lambda_0}$, where m is the Fresnel zone number, f is the focal length of the lens (e.g., 25 mm to infinite), and $\lambda_0$ is the design wavelength of light. In this prism-enhanced diffractive lens 200, the Fresnel zone shifts outwards, which increases the Fresnel zone spacing for Fresnel zones further from the center of the lens.

The size of the prism affects the zone spacing as follows: the inner radius of a given Fresnel zone increases by an amount equal to the sum of the widths of the prism structures between the given Fresnel zone and the center of the lens. To see how, consider the five prism structures 201 and six concentric rings 206 in the lens 200 shown in FIG. 2A. The inner radius of the outermost ring 206f equals the sum of $\sqrt{12f\lambda_0}$ (m=6) and the sum of the widths of the five prism structures 201. If, in this case, the prism structures 201 have widths of 0.25 microns to 0.75 microns, the inner radius of the outermost ring 206f is 1.25 microns to 3.75 microns larger than it would be without the prism structures. Thus, the inner radius of the outermost ring 206f is larger than the inner radius of the sixth Fresnel zone in a conventional lens with the same focal length and design wavelength.

Figure 3:
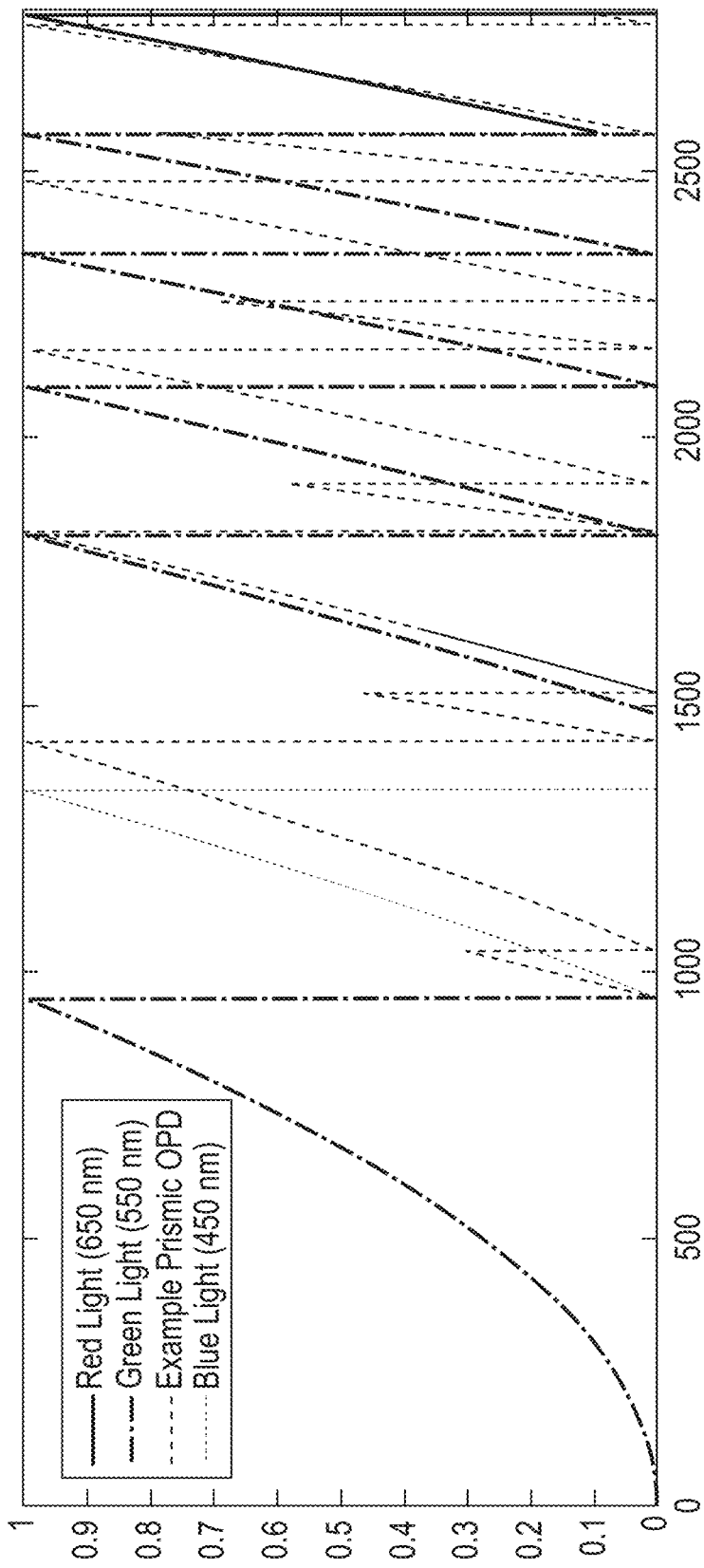
FIG. 3 shows the Optical Path Difference (OPD) across the device of FIGS. 2A-2D for on-axis light and a comparison with the OPD for phase-based diffractive lenses designed for blue, green or red light.
Figure 4:
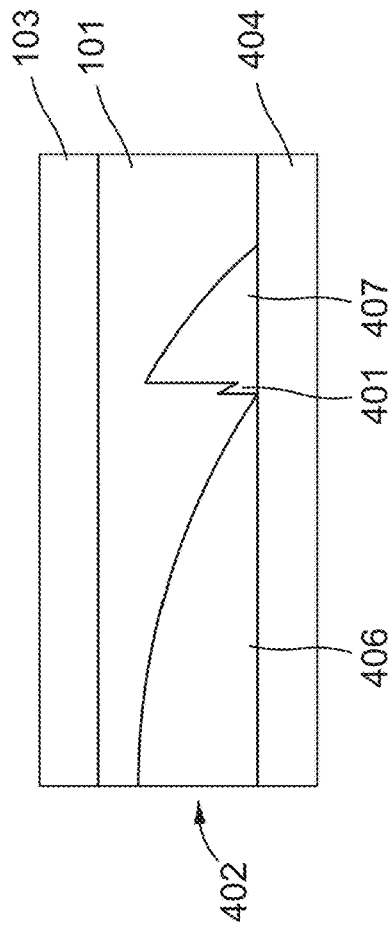
FIG. 4 shows a cross section of an electro-active lens that includes a liquid crystal layer disposed between a flat substrate and a substrate defining a Fresnel lens and a "bicuspid" prismatic structure disposed between two rings of the Fresnel lens.

In the example shown in FIGS. 2A-2D, the addition of a prism structure can be used to improve the diffraction efficiency of multi-order diffractive structures, whereby the phase reset locations occur at an integer number of wavelengths, not just a single wavelength as shown in FIGS. 3 and 4 (described below). In this case the diffraction efficiency drops drastically as a function of deviation from the design wavelength, and greater emphasis is placed on removing this limitation.

Optical Path Differences in a Prism-Enhanced Lens

By controlling the height of the surface relief profile, the optical path difference (OPD) of a prism-enhanced ophthalmic lens can be modified to correspond to different wavelengths of light in different areas of the lens. The OPD can be expressed as:

$$OPD = \frac{r^2}{2f\lambda},$$

where r is the distance from the center of the lens (the radius), f is the focal length, and $\lambda$ is the wavelength. The OPD resets at an integer number of wavelengths (e.g., 1, 2, 3, or 4 wavelengths) to create a sawtooth-like profile.

Light is also directed to the focal point via the prism structure in between Fresnel zones which improved optical performance. The combination of the addition of prism structure and the shifting of the Fresnel zones results in superior optical performance if optimized and increases diffraction efficiency.

FIG. 3 shows the on-axis OPD across the prism-enhanced ophthalmic lens 200 shown in FIG. 2 (dashed line) and the OPD of light for phase-based diffractive lenses designed for blue light (dotted line), green light (dot-dashed line), or red light (solid line). At the left side of FIG. 3, the OPD of the prism-enhanced ophthalmic lens 200 corresponds very similarly to the OPD for a diffractive lens designed to work with blue light, indicating good optical performance in that region of the prism-enhanced ophthalmic lens for blue light. In the center, due to the shifting of the phase wrap locations in the prism-enhanced ophthalmic new lens, the OPD of the prism-enhanced ophthalmic lens 200 corresponds very similarly to the OPD of a diffractive lens for green light, indicating good optical performance in that region of the prism-enhanced ophthalmic lens 200 for green light. A similar situation occurs at the edge of the lens when the OPD of the prism-enhanced ophthalmic lens 200 is similar to that of a diffractive lens for red light.

The correspondence of the OPDs of the different areas of the prism-enhanced ophthalmic lens 200 to the OPDs of diffractive lenses designed for different wavelengths indicates that the lens 200 is not as wavelength sensitive as existing diffractive optics. The light from the prism zones is also brought into the focal point via refraction to avoid losses at the areas where the phase wraps move outwards.

A "Bicuspid" Prism-Enhanced Lens

FIG. 4 illustrates another electro-active, prism-enhanced lens 400. Again, the prism-enhanced lens 400 includes a surface relief structure 402 that is formed on one surface of a substrate 404 and that defines a Fresnel lens that includes concentric rings 406 and 407. The surface relief structure 402 also includes a prism term 401 that is cut into the interface between concentric rings 406 and 407. Put differently, the base of the prism term 401 overlaps with the base of concentric ring 407, forming a bicuspid prismatic structure (i.e., a prismatic structure with two peaks). In operation, the prism term 401 directs light into the focal point of the lens 400. It may also mitigate diffraction efficiency reductions at wavelengths higher and lower than the design wavelength of the Fresnel lens.

Figure 5:
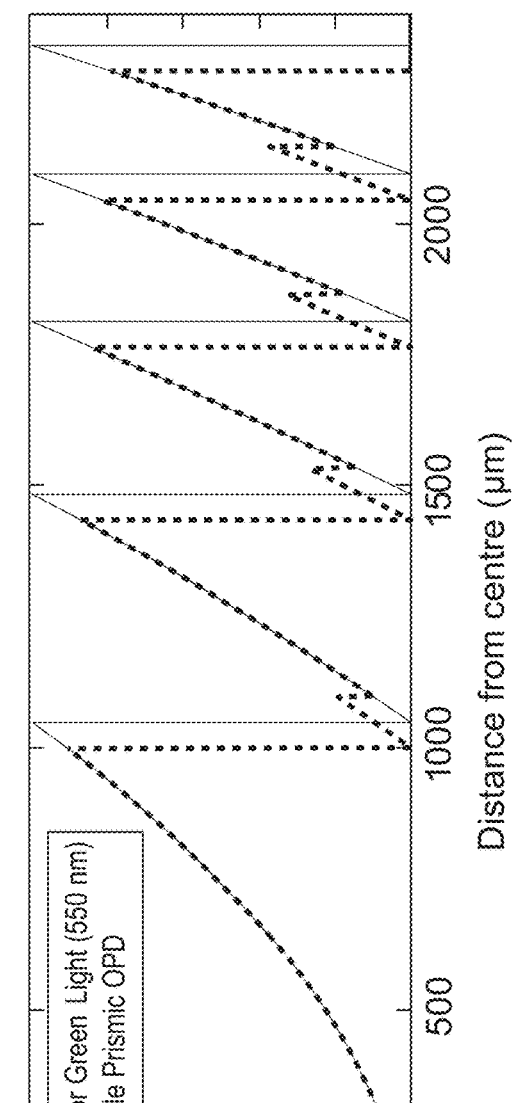
FIG. 5 shows the OPD across the device of FIG. 4 for on-axis light and a comparison with the OPD for phase-based diffractive lenses designed for green light.

FIG. 5 is a plot of the OPDs for the prism-enhanced lens 400 of FIG. 4 (dashed line) and a conventional Fresnel lens designed for optimum performance at a wavelength of 550 nm (solid line). In this case, the prism structures in the prism-enhanced lens 400 do not shift the Fresnel zone locations, and instead take up areas before and after each phase reset. FIG. 5 shows that the majority of the OPD of the prism-enhanced lens 400 is the same as the OPD of the conventional Fresnel lens designed for green light (the Fresnel zones do not move locations when compared to a diffractive lens for the same wavelength). The prism-enhanced lens 400 has a prism structure in the area before and after the location of each phase wrap in a standard diffractive lens. This suggests that superior optical performance may be induced for other wavelengths by choosing the prism angle to correspond to the focal point of light of different wavelengths.

Alternative Prism-Enhanced Lenses

FIGS. 6-8 show more alternative electro-active, prism-enhanced lenses.

In the lens 600 of FIG. 6, a surface relief structure 602 defines a rounded optic 601 disposed between Fresnel zones 606 and 607. In the lens 700 of FIG. 7, a surface relief structure 702 defines a prism structure 701 with multiple peaks 703 disposed next to Fresnel zone 706 and overlapping with Fresnel zone 707. And in the lens 800 of FIG. 8, the surface relief structure 802 defines a gap element, or optical blank area 801, between Fresnel zones 806 and 807. This gap element 801 may have a width of about 5 microns to 200 microns (e.g., 7.5 microns, 10 microns, 15 microns, 25 microns, 50 microns, 75 microns, 100 microns, 125 microns, 150 microns, 175 microns, or any sub-range or value within this range). For instance, the gap element 801 is about 25 microns wide.

In each of these lenses, the exact shape of the surface relief structure may be selected to reduce the wavelength dependence of the optic, focus light at the focal point over a wide range of wavelengths, and/or mitigate the reduction of diffraction efficiency when working outside of the design wavelength. Those of skill in the art will readily appreciate that the prism structure can take additional forms, including forms with different dimensions, additional peaks, different shapes, etc., with the scope of the invention extending to any number of intermediate structures between Fresnel zones.

Figure 9:
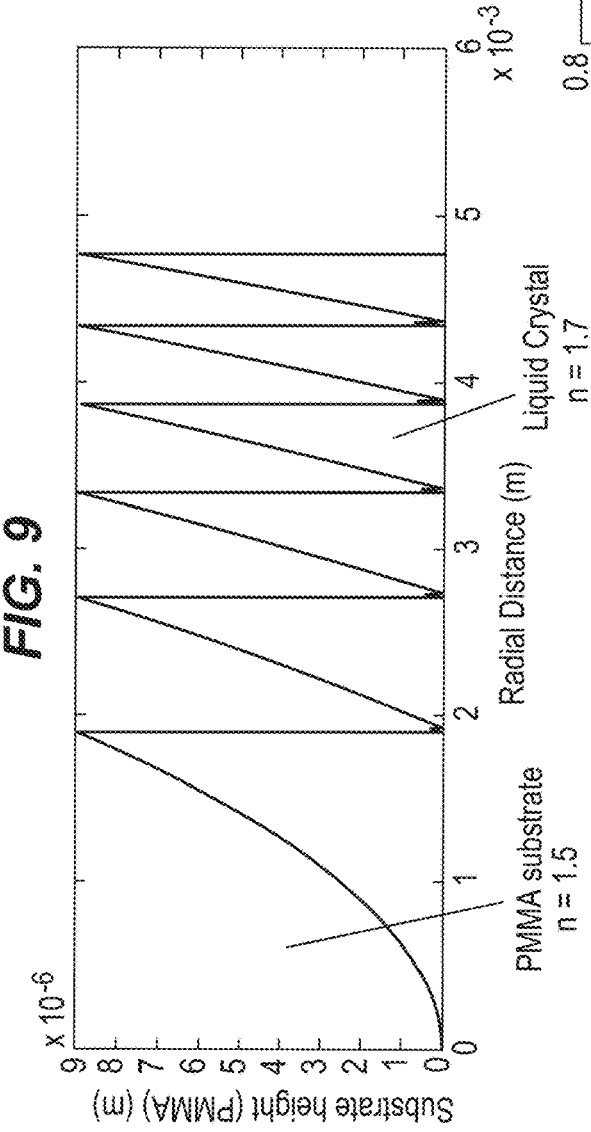
FIG. 9 shows a profile view of an electro-active, prism-enhanced lens.

FIG. 9 shows an example design of a prism-enhanced lens with the parameters listed in TABLE 2 (below). The prism-enhanced lens has a design optical power of +1.00 D at a wavelength of 550 nm. It includes a surface relief structure with concentric rings and prism structures formed in a PMMA substrate. The concentric rings are each about 9 microns high, with widths varying from almost 2 mm to about 0.5 mm. There is one ring-shaped prism structure between each pair of concentric rings. Each ring-shaped prism structure is about 25 microns wide and about 250 nm to 750 nm tall. The void or cavity defined by the surface relief structure (with concentric rings and prism structures) and the other substrate (not shown) is filed with liquid crystal material whose refractive index is about 1.7.

TABLE 2

| Design Wavelength | 550 nm |
| Design Optical Power | +1.00 D |
| Number of Wavelengths per Phase Reset | 3 (at 550 nm) |

TABLE 2-continued

| Prism Width | 25 microns |
| Prism Height | 250 nm to 750 nm |
| Number of Prisms | 5 |
| Substrate Material | PMMA (refractive index = 1.5) |
| Liquid Crystal Material | Refractive index = 1.7 |

This is just one example configuration to illustrate the concept of the prism-enhanced design. Other parameters and prisms can be used to further modify the optical properties of the lens to further improve the diffraction efficiency of the lens and reduce chromatic aberration. In this example the lens has a phase reset at three wavelengths of optical path difference, rather than a single wavelength simplifying fabrication of the lens.

Optical Performance of Prism-Enhanced Lenses

In general, the optical performance of a prism-enhanced lens may be better on average than that of a conventional Fresnel lens over a broader range of wavelengths, with the conventional Fresnel lens having better performance at a particular wavelength or narrow range of wavelengths. For instance, a prism-enhanced lens may have a focal length that varies less with wavelength than a conventional Fresnel lens.

Similarly, a prism-enhanced lens may have a Strehl ratio that deviates less as a function of wavelength over a given wavelength band that that of a conventional Fresnel lens. As understood by those of skill in the art of optics, the Strehl ratio is frequently defined as the ratio of the peak aberrated image intensity from a point source compared to the maximum attainable intensity using an ideal optical system limited only by diffraction over the system's aperture. It is also often expressed in terms of the intensity at the image center (the intersection of the optical axis with the focal plane) due to an on-axis source. In most cases these definitions result in a very similar figure (or identical figure, when the point of peak intensity is at the center due to symmetry).

A prism-enhanced lens may have a range of Strehl ratios over a given wavelength region which are higher (either across the wavelength region or on average) than that of a standard diffractive kinoform over the same wavelength region. In other cases, the smallest Strehl ratio of a prism-enhanced lens may be larger than the smallest Strehl ratio of a standard diffractive kinoform over the visible portion of the electromagnetic spectrum. For instance, a prism-enhanced lens may have a minimum Strehl ratio of 0.65, 0.70, 0.75, 0.80, 0.85, or higher over a range of about 450 nm to about 650 nm. A Strehl ratio of 0.65 may acceptable for ophthalmic applications using low-cost optics.

Figure 10:
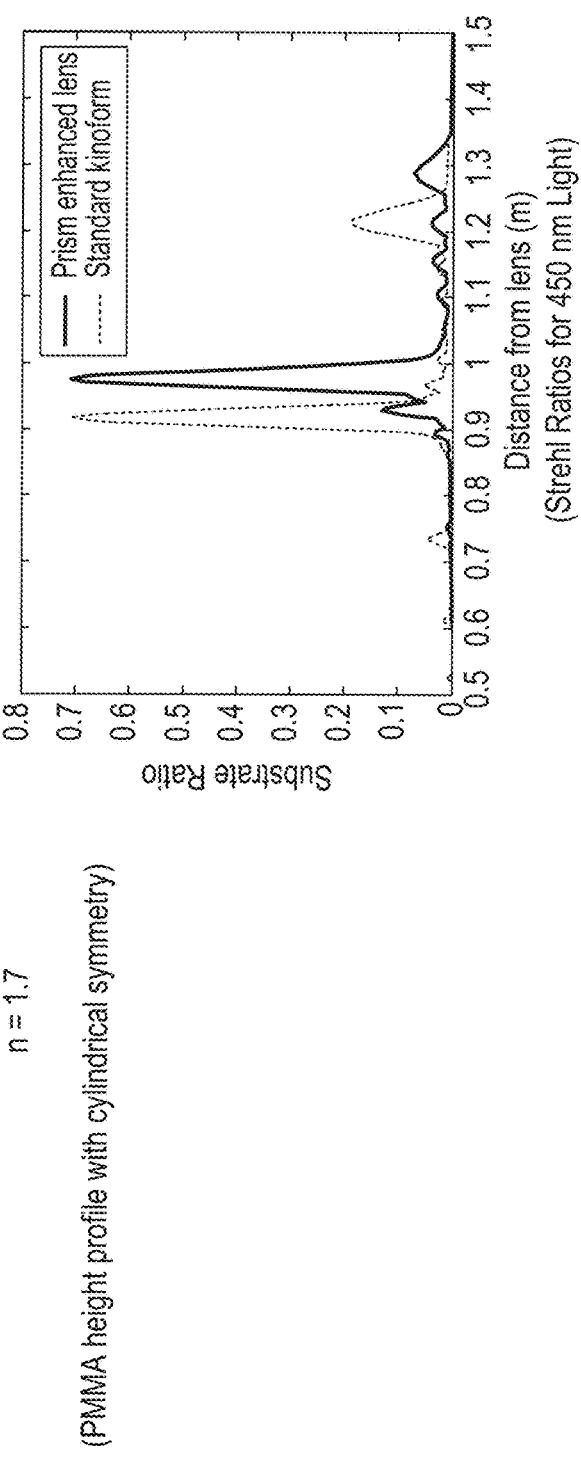
FIGS. 10-12 show the difference in Strehl ratio when comparing a standard diffractive kinoform lens and the example prism-enhanced lens for wavelengths of light of 550 nm, 650 nm, and 450 nm.
Figure 12:
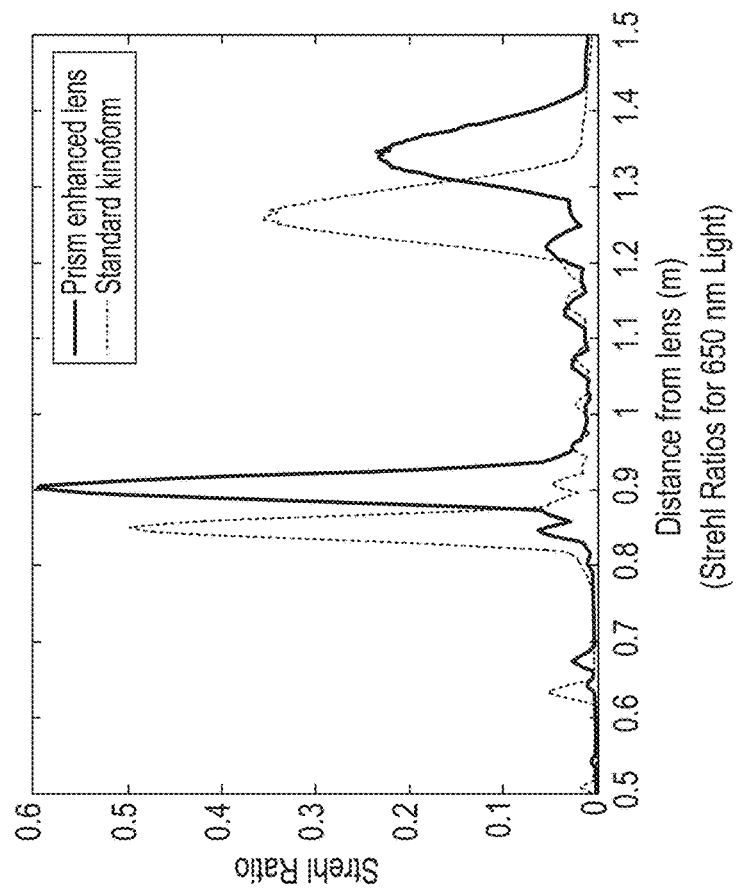
Figure 11:
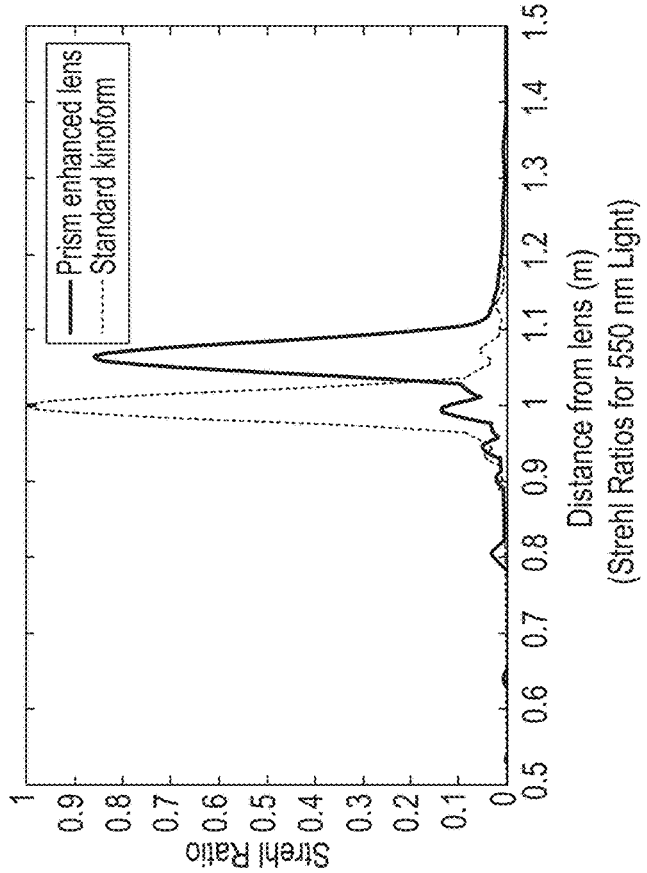

FIGS. 10, 11, and 12 show the difference in Strehl ratio when comparing a standard diffractive kinoform lens and the example prism-enhanced lens for wavelengths of light of 450 nm, 550 nm and 650 nm, respectively. In the case of 550 nm in FIG. 11, the standard diffractive lens performs better, as expected due to the design wavelength corresponding to 100% diffraction efficiency. The Strehl ratio of the prism-enhanced lens is above 0.8, and hence can be considered to be close to a diffraction limited system.

Some of the advantages associated with this particular example of the prism-enhanced lens are demonstrated in FIGS. 11 and 12. In FIG. 12, where 650 nm light is considered, the Strehl ratio is about 0.1 higher in the prism-enhanced lens than in a standard diffractive lens. The prism-enhanced lens also has lower chromatic aberration compared to the standard diffractive lens, with the focal length shifted from 0.85 m to 0.90 m, therefore closer to the 1 m design focal length. The chromatic aberration is also lower for the prism-enhanced lens in FIG. 12 when considering 650 nm light, with similar Strehl ratios observed between the prism-enhanced lens and the standard diffractive lens.

Figure 13:
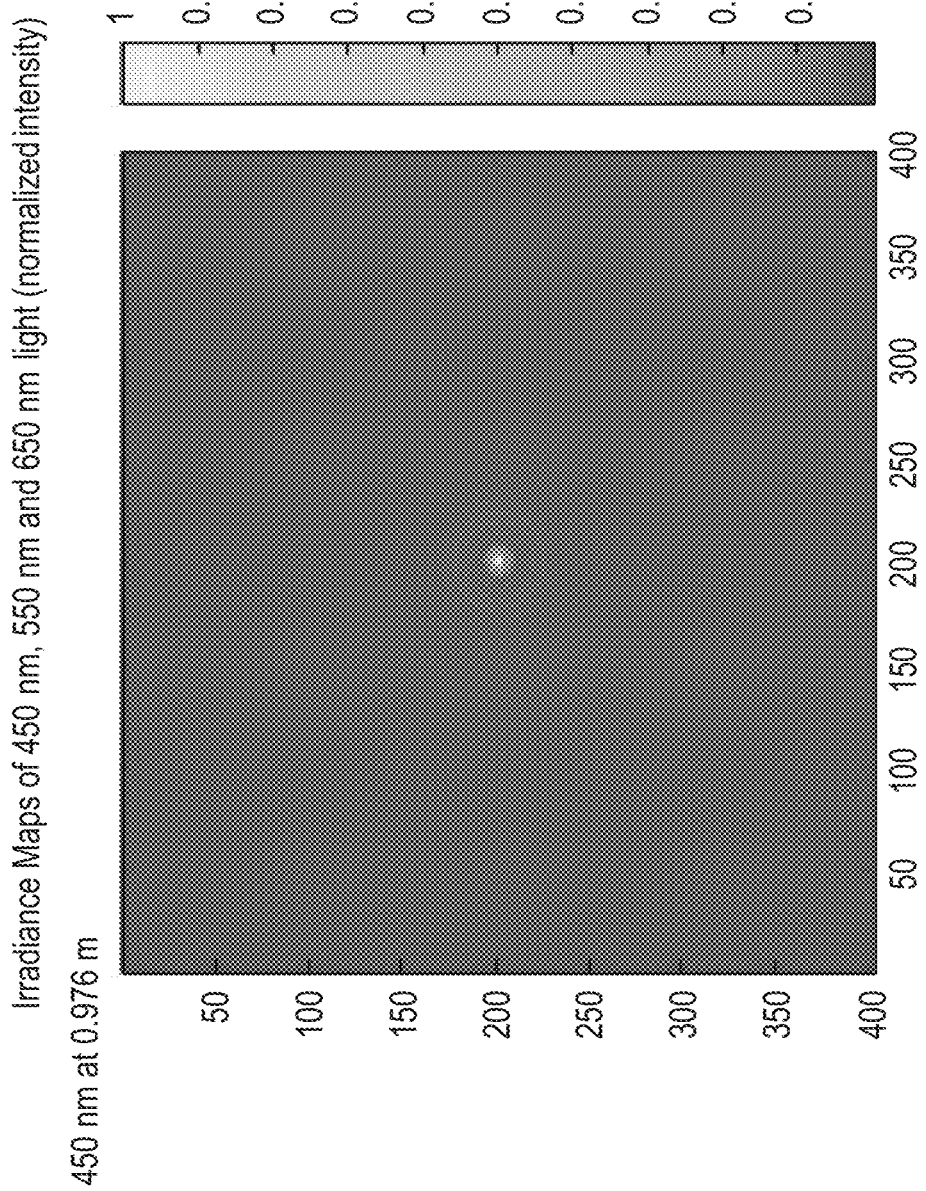
FIG. 13 shows a normalized irradiance map of light at a wavelength of 450 nm focused by a prism-enhanced lens to a distance of 0.976 meters.
Figure 15:
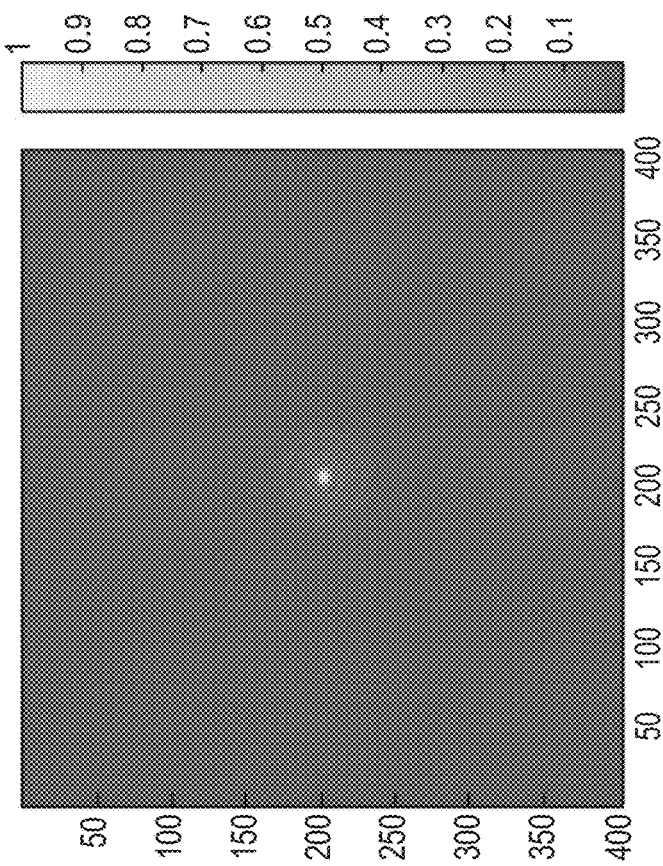
FIG. 15 shows a normalized irradiance map of light at a wavelength of 650 nm focused by a prism-enhanced lens to a distance of 0.902 meters.
Figure 14:
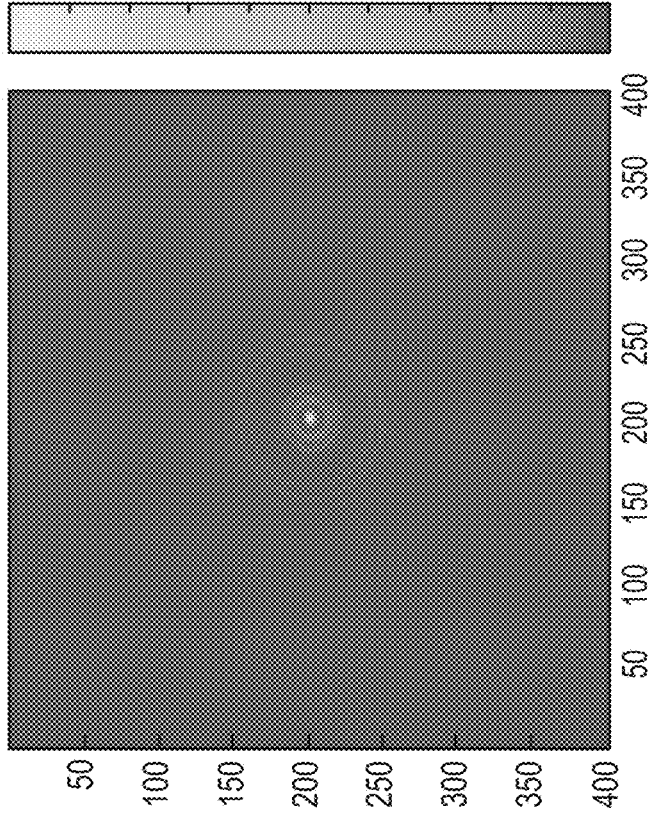
FIG. 14 shows a normalized irradiance map of light at a wavelength of 550 nm focused by a prism-enhanced lens to a distance of 1.064 meters.

FIGS. 13-15 show irradiance maps in the focal planes of the prism-enhanced lens of FIGS. 10-12 at different wavelengths. That is, they show the transverse irradiance distribution at the focal plane for each wavelength. Each irradiance map shows a clear focal point, indicating the lens exhibits good optical performance across the visible spectrum. FIG. 13 shows the irradiance map for 450 nm light at a distance of 0.976 meters from the prism-enhanced lens. FIG. 14 shows the irradiance map for 550 nm light at a distance of 1.064 meters from the prism-enhanced lens. And FIG. 15 shows the irradiance map for 650 nm light at a distance of 0.902 meters from the prism-enhanced lens.

Therefore, the prism-enhanced example described above improves the optical quality of the lens in the blue wavelength region, while maintaining a Strehl ratio close to the diffraction limit at the design wavelength, with little to no reduction of optical quality at 650 nm. In addition, the chromatic aberration is smaller at wavelengths outside the design wavelength, as illustrated in the TABLE 3, which gives parameters for multi-order (m=3) prism-enhanced and standard diffractive lenses:

TABLE 3

|  | Prism-Enhanced Lens | | | Standard Diffractive | | |
| --- | --- | --- | --- | --- | --- | --- |
| Wavelength (nm) | 450 | 550 | 650 | 450 | 550 | 650 |
| Focal Length (m) | 0.98 | 1.06 | 0.90 | 0.92 | 1.00 | 0.85 |
| Strehl Ratio | 0.71 | 0.87 | 0.60 | 0.71 | 1.00 | 0.50 |
| Power (D) | 1.02 | 0.94 | 1.11 | 1.09 | 1.00 | 1.18 |

Further modifications to the prism sections, such as the shape, width, height and material may offer further improvements to the optical properties with respect to wavelength and chromatic aberration.

Making a Prism-Enhanced Lens

The surface relief structures disclosed herein can be formed of any suitable material using any suitable technique. Suitable materials include but are not limited to high index adhesives, MR-10 polymer, polycarbonate, polypropylene, poly(methyl methacrylate) (PMMA), acrylonitrile butadiene styrene (ABS) plastic, and amorphous polyethylene terephthalate (A-PET). These materials can be molded, etched, embossed, or otherwise processed to form components for prism-enhanced diffractive lenses. For instance, they may be molded according to the techniques disclosed in International Application No. PCT/US2016/012121, entitled "Methods and Systems for Mold Releases," which is incorporated herein by reference.

In addition, the invention is not restricted in scope to nematic liquid crystal in vertical alignment, other methods of aligning the liquid crystal or other methods of aligning the liquid crystal or other liquid crystal phases can be used, such as planar alignment, twisted nematic (TN), hybrid aligned nematic (HN), chiral nematic, blue phase, dark conglomerate phase, polymer dispersed and Smectic C* phase liquid crystals as examples. Similar optical properties may be realized by matching or un-matching the surface relief structure and the liquid crystal material.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An electro-active lens comprising:
   a first substrate;
   a second substrate;
   a liquid crystal material disposed between the first substrate and the second substrate; and
   a surface relief structure formed in the first substrate opposite the second substrate, the surface relief structure defining a Fresnel lens having a plurality of concentric rings and at least one prism structure, disposed between a pair of concentric rings in the plurality of concentric rings, to mitigate diffraction efficiency reductions at wavelengths higher and lower than a design wavelength of the Fresnel lens.

2. The electro-active lens of claim 1, wherein an mth ring in the plurality of concentric rings has an inner radius greater than:

$$r_m = \sqrt{2mf\lambda_0},$$

where m is an integer greater than 1, f is a focal length of the Fresnel lens, and $\lambda_0$ is a design wavelength of the electro-active lens.

3. The electro-active lens of claim 1, wherein the at least one prism structure comprises m−1 prism structures having an aggregate width w and an inner radius of the mth ring in the plurality of concentric rings is equal to a sum of $r_m$ and w.

4. The electro-active lens of claim 1, wherein the at least one prism structure comprises an annular prism structure concentric with the pair of concentric rings.

5. The electro-active lens of claim 1, wherein the at least one prism structure comprises an annular prism structure between and concentric with each pair of concentric rings in the plurality of concentric rings.

6. The electro-active lens of claim 1, wherein the at least one prism structure partially overlaps with one concentric ring in the pair of concentric rings.

7. The electro-active lens of claim 1, wherein the at least one prism structure defines a plurality of peaks.

8. The electro-active lens of claim 1, wherein the at least one prism structure has a curved surface.

9. The electro-active lens of claim 1, wherein the at least one prism structure has a height of about 0.1 microns to about 50 microns and a width of about 5 microns to about 200 microns.

10. The electro-active lens of claim 1, wherein the electro-active lens has a Strehl ratio of greater than about 0.85 at a wavelength of about 550 nm.

11. The electro-active lens of claim 10, wherein the electro-active lens has a Strehl ratio of greater than about 0.70 at a wavelength of about 450 nm.

12. The electro-active lens of claim 11, wherein the electro-active lens has a Strehl ratio of greater than about 0.60 at a wavelength of about 450 nm.

13. The electro-active lens of claim 1, wherein the electro-active lens has a Strehl ratio of greater than about 0.65 over a wavelength range of about 450 nm to about 650 nm.

14. The electro-active lens of claim 1, wherein the electro-active lens has a Strehl ratio of greater than about 0.80 over a wavelength range of about 450 nm to about 650 nm.

15. The electro-active lens of claim 1, wherein the liquid crystal material can change a focal length of the electro-active lens in response to an applied voltage.

16. An electro-active lens comprising:
    a first substrate;
    a second substrate;
    a liquid crystal material disposed between the first substrate and the second substrate; and
    a surface relief structure formed in the first substrate opposite the second substrate, the surface relief structure defining a Fresnel lens having a plurality of concentric rings and at least one prism structure, disposed between a pair of concentric rings in the plurality of concentric rings, to reduce a variation in a Strehl ratio of the Fresnel lens over a wavelength range of about 450 nm to about 650 nm.

17. The electro-active lens of claim 16, wherein the electro-active lens has a Strehl ratio of greater than about 0.85 at a wavelength of about 550 nm.

18. The electro-active lens of claim 17, wherein the electro-active lens has a Strehl ratio of greater than about 0.70 at a wavelength of about 450 nm.

19. The electro-active lens of claim 18, wherein the electro-active lens has a Strehl ratio of greater than about 0.60 at a wavelength of about 450 nm.

20. The electro-active lens of claim 16, wherein the electro-active lens has a Strehl ratio of greater than about 0.65 over a wavelength range of about 450 nm to about 650 nm.

21. The electro-active lens of claim 16, wherein the electro-active lens has a Strehl ratio of greater than about 0.80 over a wavelength range of about 450 nm to about 650 nm.

* * * * *